US 6,768,968 B2

(12) United States Patent
Ignatowski et al.

(10) Patent No.: US 6,768,968 B2
(45) Date of Patent: Jul. 27, 2004

(54) METHOD AND SYSTEM OF AN INTEGRATED SIMULATION TOOL USING BUSINESS PATTERNS AND SCRIPTS

(75) Inventors: Michael Ignatowski, Red Hook, NY (US); Noshir Cavas Wadia, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 10/126,245

(22) Filed: Apr. 18, 2002

(65) Prior Publication Data

US 2003/0200059 A1 Oct. 23, 2003

(51) Int. Cl.[7] .................. G06F 11/30; G06F 17/30; G06F 7/00
(52) U.S. Cl. .................. 702/186; 707/10; 707/102
(58) Field of Search ................ 702/186; 707/2, 707/4, 10, 100, 102; 706/49

(56) References Cited

U.S. PATENT DOCUMENTS

| | | | | |
|---|---|---|---|---|
| 5,706,405 A | * | 1/1998 | Short et al. ............ | 706/45 |
| 5,724,262 A | | 3/1998 | Ghahramani ............ | 364/551.01 |
| 5,893,905 A | | 4/1999 | Main et al. ............ | 705/11 |
| 6,119,097 A | | 9/2000 | Ibarra ............ | 705/11 |

FOREIGN PATENT DOCUMENTS

| | | | | |
|---|---|---|---|---|
| WO | WO 99/57661 | 5/1998 | ............ | G06F/17/60 |
| WO | WO 00/07129 | 7/1999 | ............ | G06F/17/60 |

OTHER PUBLICATIONS

Campbell, B.; "Systems Dynamics in Information Systems Analysis: An Evaluation Case Study", *Proceedings of Systems Modeling for Business Process Improvement Workshop*, Coleraine, Ireland, Mar. 29–31, 1999, Chapter 3, pp 33–46.

Presley, A. R.; "A Multi-View Enterprise Modeling Scheme", *Proceedings of the 6th Industrial Engineering Research Conference*, Miami, Florida, May 1997, 6 pages.

Yazdani, B.; "Models of Concurrent Product Design and Development in the Automotive Industry", *ICE '97, International Conference on Concurrent Enterprising for Competitiveness*, 4th, Nottingham, Oct. 8–10, 1997, pp. 99–107.

Song, J., et al.; "Design Alternatives for Scalable Web Server Accelerators", IBM T.J. Watson Research Center, IEEE 2000, pp 184–192.

(List continued on next page.)

*Primary Examiner*—John Barlow
*Assistant Examiner*—Meagan S Walling
(74) *Attorney, Agent, or Firm*—Farrokh E. Pourmirzaie

(57) ABSTRACT

A method, system and article of manufacture for estimating the performance of a computer system are provided. Initially, a business pattern representative of the expected usage of the computer system is identified. Then, for each parameter associated with each predefined script, which corresponds to the identified business pattern, a value is established. The computer system hardware characteristics and performance objectives are identified next. The performance estimate is then calculated utilizing the established parameter values, identified hardware characteristics and performance objectives. To calculate the performance estimate, the script measurements data is read from a table of previously measured values, and a weighted average number of page visits per user, a weighted average visit rate and a weighted average service time for each target device in the computer system are calculated. A total response time and a system throughput are calculated by varying each target device queue length and user arrival rate until the performance objectives are reached.

31 Claims, 4 Drawing Sheets

OTHER PUBLICATIONS

Iyengar, A. et al.; "A General Methodology for Characterizing Access Patterns and Analyzing Web Server Performance", *Proceedings of the Sixth International Symposium on Modeling, Analysis and Simulation of Computer and Telecommunication Systems*, Montreal, Canada, Jul. 1998, pp 167–174.

Challenger, J. et al.; "Engineering Highly Accessed Web Sites for Performance", IBM Research, T. J. Watson Research Center, Yorktown Heights, NY 10598, 19 pages.

Iyengar, A., et al.; "High–Performance Web Site Design Techniques", Excerpt from IEEE Internet Computing, Mar.–Apr. 2000, pp 17–26 http://computer.org/internet/.

Iyengar, A. et al.; "An Analysis of Web Server Performance", IBM Research Division, T. J. Watson Research Center, Yorktown Heights, NY 10598, 5 pages.

Iyengar, A. et al.; "Analysis and Characterization of Large–Scale Web Server Access Patterns and Performance", IBM Research Division, IBM T.J. Watson Research Center, Yorktown Heights, NY 10598, 30 pages.

* cited by examiner

METHOD AND SYSTEM OF AN INTEGRATED SIMULATION TOOL USING BUSINESS PATTERNS AND SCRIPTS

FIELD OF THE INVENTION

The present invention relates generally to an integrated simulation tool, and more particularly to a method of an integrated simulation tool for estimating performance of complex computer systems using business patterns and scripts.

BACKGROUND OF THE INVENTION

As e-business and its related requirements grow at "Web speed", a critical issue is whether the IT infrastructure supporting the Web sites has what it needs to provide available, scalable, fast, and efficient access to the company's information, products, and services. More than ever, CIOs (Chief Information Officers) and their teams struggle with the challenges to minimize downtime and network bottlenecks and maximize the use of the hardware and software that comprises their e-business infrastructure.

Capacity planning and performance modeling of complex computer systems generally require detailed information about the workload assumed to be running on those systems. For detailed performance studies of processors, a trace of the workload is typically used. This, combined with the right model of the processor hardware can be used to accurately estimate the average number of cycles used per instruction. Combining this with the processor cycle time leads to an accurate estimate for the processor MIPS (Million Instructions Per Second).

For higher-level system modeling where the user throughput rate is to be estimated, the processor MIPS rate is typically taken as an input assumption for the model. This, combined with the path length (i.e. number of instructions executed by a typical user) can be used to estimate the system throughput in terms of the number of users per second that can be served (i.e. user arrival rate). Additional factors, such as the average number of network bytes transferred, or disk I/O operations done per user can also be factored into the calculations.

A simple capacity planning can be done by calculating the number of users per second that can be processed without exceeding the utilization requirements of any of the system resources (i.e. processors, disks, network). More detailed estimates that also project the overall response time per user (factoring in queuing effects on various resources) can also be made using well known Mean Value Analysis techniques.

While these types of system analysis do not require detailed instruction traces, they still require path length, disk IO, and network data rates for the average user. Often times this information can be obtained from measurements or traces. However, for many studies of new workloads in the rapidly emerging world of web serving and e-Business, such data often does not exist due to the newness of the workloads, or because projections are needed for an application that has not yet been developed.

Studies of actual web site operations show that most applications can be grouped into a small number of basic "business patterns". The business patterns include patterns such as: user-to-data, user-to-business, user-to-online-buying, business-to-business, and user-to-user. Within each of these business patterns, it has been found that the most user behavior is dominated by a small number of basic usage patterns. These basic usage patterns are referred to here as user scripts or just "scripts". Each script consists of a number of basic steps or page visits. In this view of user activity, a user enters the system, executes one of these scripts, and leaves the system. The probability of choosing each script, along with the definition of the steps within each script is some of the key parameters defining a business pattern.

Studies done by IBM have identified several workload business patterns. These business patterns characterize the functions of most large web sites and e-business systems. Those of ordinary skill in the art will recognize that the present invention is not limited to those workload business patterns identified by IBM. The present invention will equally apply to the business patterns identified by others or yet to be identified. The workload business patterns which are identified by the IBM studies, are mapped to basic business patterns and defined as follows:

Publish/Subscribe (user-to-data). Sample publish/subscribe sites include search engines, media sites such as newspapers and magazines, and event sites such as those for the Olympics and for the championships at Wimbledon. The content of these sites changes frequently, driving the changes to page layouts. While the search traffic is low volume, the number of unique items sought is high resulting in the largest number of page visits of all site types. As an example, the Wimbledon site successfully handled a peak volume of 430,000 hits per minute using IBM's WebSphere Edge Server. Transaction traffic is lowest and security considerations are minor compared to other site types.

Online Shopping (user-to-online-buying). Sample sites include typical retail sites where users buy books, clothes, and even cars. The site content can be relatively static, such as a parts catalog, or dynamic where items are frequently added and deleted as, for example, promotions and special discounts come and go. Search traffic is heavier than the publish/subscribe sites, though the number of unique items sought is not as large. Transaction traffic is moderate to high and always growing. Typically between 1% and 5% of the traffic are buy transactions. When users buy, security requirements become significant and include privacy, no repudiation, integrity, authentication, and regulations.

Customer Self-Service (user-to-business). Sample sites include online banking, tracking packages, and making travel arrangements. Data comes largely from legacy applications. Security considerations are significant for home banking and purchasing travel services, less so for other uses. Search traffic is low volume; transaction traffic is low to moderate, but growing.

Online Trading (user-to-business). Of all site types, online trading sites have the most volatile content, the highest transaction volumes (with significant swing), the most complex transactions, and are extremely time sensitive. Nearly all transactions interact with the back end servers. Security considerations are high, equivalent to online shopping, with an even larger number of secure pages. Search traffic is low volume.

Business-to-Business (business-to-business). Data comes largely from legacy systems. Security requirements are equivalent to online shopping. Transaction volume is moderate, but growing; transactions are typically complex, connecting multiple suppliers and distributors.

Those of ordinary skill in the art will recognize that the present invention is not limited to the above workload business patterns identified by IBM. The present invention will equally apply to the business patterns identified by others or yet to be identified. For example, although the business patterns such as Reservation System and Inventory Management System are not discussed here, the present invention can be used to simulate performance of such systems as well.

A mixture of one or more predefined user scripts can characterize each of these business patterns. The user scripts consist of a number of basic steps or page visits that incur by a user within a given business pattern. Those of ordinary skill in the art will recognize that the present invention is not limited to the user scripts discussed herein. Rather, the present invention applies to any script of user behavior within a given business pattern. To illustrate by way of an example, a "user-to-online-buying" business pattern may have user behavior dominated by the following three predefined scripts of user behavior:

User-to-Online-Buying Business Pattern

| Script Name | Page Visits per Script | Frequency Of Script |
|---|---|---|
| Browse | Visit home page<br>Category display (random department)<br>Category display (random category)<br>Category display (random subcategory)<br>Product display (random product)<br>Leave web site | 85% |
| Search | Visit home page<br>Select "Search" to go to Search panel<br>Enter keywords and press Find<br>Select New Search<br>Enter keywords and press Find<br>Leave web site | 10% |
| Buy | Visit home page<br>Select Sign In from home page<br>Select Sign On from menu<br>Enter user ID and select Sign-On<br>Go to Specialty Shop<br>Choose Shop (category display)<br>Product display<br>Add to shopping bag<br>Select Confirm on shipping info pop-up<br>Select Checkout<br>Select Continue Checkout<br>Enter credit card info and select Buy Now<br>Leave web site | 5% |

Part of the definition of a business pattern is specifying the relative proportion or "frequency" of scripts in the customer mix. A new user may have equal probabilities of executing any scripts, or some very common scripts may get executed with a high frequency. Changing the relative frequency of scripts within the mix also allows different browse/buy ratios to be specified.

Given a set of predefined scripts, measurements of their path lengths, disk I/O operations, and network transfers can be made on an existing system. The actual content of each script, as well as the measured parameters may tend to gradually change over time as usage patterns and software characteristics change. Often the exact content of the scripts and their measured parameters will be considered a trade secret.

SUMMARY OF THE INVENTION

The present invention discloses a method, system and article of manufacture for estimating the performance of a computer system. Initially, a business pattern representative of the expected usage of the computer system is identified. Then, for each parameter associated with each predefined script, which corresponds to the identified business pattern, a value is established. The computer system hardware characteristics and performance objectives are identified next. The performance estimate is then calculated utilizing the established parameter values, identified hardware characteristics and performance objectives. To calculate the performance estimate, the script measurements data is read from a table of previously measured values, and a weighted average number of page visits per user, a weighted average visit rate and a weighted average service time for each target device in the computer system are calculated. A total response time and a system throughput are calculated by varying each target device queue length and user arrival rate until the performance objectives are reached.

The present invention provides an integrated simulation tool (i.e. a modeling tool) for projecting system performance without detailed knowledge of the workload characteristics being required. The present invention uses "business patterns" and "scripts" for typical computer installations to define the relevant workload characteristics. The "business patterns" describe the type of work that a computer installation will be used for (e.g. on-line shopping, on-line trading, etc.). The "scripts" describe typical operations within a business pattern (e.g. browse a catalog, buy an item, get a stock quote, etc.). Both the collection of business patterns and scripts are defined based on detailed studies of actual customer operations.

The user of the modeling tool in accordance with the present invention can define a workload by specifying a business pattern and the relative frequencies of scripts within that pattern that best match the workload on some current or future computer system. The modeling tool will then construct the needed description of a composite workload for the performance estimates based on a weighted average of previous data collected from actual measurements for various scripts on various hardware or software combinations. Abstracted data from previous measurements are kept in database tables within the integrated modeling tool.

This information is then used in an integrated analytic simulation model that employs variations of Mean Value Analysis techniques to produce performance estimates for a computer system.

BRIEF DESCRIPTION OF THE DRAWINGS

The present invention will become more apparent to those of ordinary skill in the art after considering the preferred embodiments described herein with reference to the attached drawings in which like reference numbers represent corresponding elements throughout.

DETAIL DESCRIPTION OF THE PREFERRED EMBODIMENT

In the following description of the preferred embodiment, reference is made to the accompanying drawings which form a part thereof, and which is shown by way of illustration a specific embodiment in which the present invention may be practiced. It is to be understood that other embodiments may be utilized as structural changes may be made without departing from the scope of the present invention.

Hardware Environment

Figure 1:
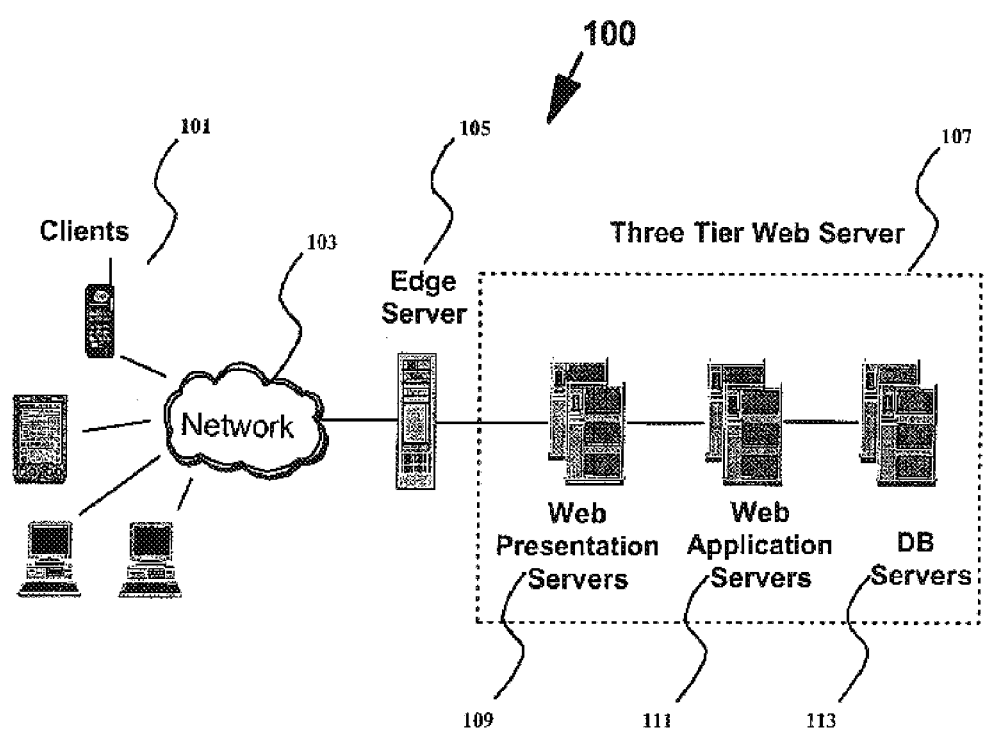
FIG. 1 illustrates an exemplary computer hardware environment that may be used in accordance with the present invention.

FIG. 1 illustrates an exemplary computer hardware environment that may be used in accordance with the present invention. In the exemplary environment, the infrastructure 100 supporting most high volume web sites typically has multiple components which include clients 101, the network 103, a special purpose server called edge server 105, and one or more computer systems with multiple layers of server machines 109, 111 and 113 within the web server 107. These multiple server machine layers are frequently called tiers, with each tier handling a particular set of functions such as serving content (i.e. web presentation servers 109), providing integration business logic (i.e. web application servers 111), or processing database transactions (i.e. database servers 113).

The clients 101 are devices that serve as the interface to the user. For example, the clients comprise a personal computer running a web browser, or a wireless device for mobile users. The type of client determines the delay associated with the client software operations for sending and receiving requests to the web server 107.

The network 103, for example the Internet, is modeled as a generic delay associated with transferring data between the web server 107 and the client 101. Specific queuing delays along the network 103, and the effects of caching and content serving within the network 103 are not modeled.

The edge server 105 is typically a special purpose server acting as an interface between the network 103 and the rest of the web server 107. It can be implemented as a single server or multiple servers acting in parallel. The edge server 105 may implement any or all of the following functions: Firewall—which implements security features, Network Dispatcher—which routes incoming requests to multiple server nodes in the next tier, and Content Caching—which holds cached copies of common content files (e.g. html, jpeg, etc.) and supplies them directly to clients 101 without interacting with the rest of the web server 107.

The web presentation servers (i.e. HTTP servers) 109 respond to http requests from clients 101 and either supply static content if available, or pass the request on to the next tier. The presentation servers 109 are typically (but not necessarily) implemented as a number of small servers operating in parallel.

The web application servers 111 provide integration business logic needed to execute the actual web application. The web application servers 111 are typically (but not necessarily) implemented as a number of small to medium servers operating in parallel.

The database servers 113 are used to process database transactions requiring a high level of reliability, such as financial transactions. The database servers 113 are typically (but not necessarily) implemented as a single large SMP (Symmetric Multi Processor) server. A second SMP server is often configured as a standby backup server.

Those of ordinary skill in the art will recognize that present invention is not limited to the web server configuration described above. For example, the three-tier web server of the exemplary environment may be combined into a two-tier or a single-tier structure. In a two-tier structure, the presentation and application tiers are implemented on a single "web tier", and the database server is implemented on a physically separate server.

Those of ordinary skill in the art will further recognize that the computer system of the present invention may be comprised of a computer with one or more computer processors, one or more external storage devices, output devices such as a computer display monitor and a printer, a textual input device such as a computer keyboard, a graphical input device such as a mouse, and a memory unit. The computer processor is connected to the external storage device, the display monitor, the printer, the keyboard, the mouse, and the memory unit. The external storage device and the memory unit may be used for the storage of data and computer program code. The external storage device may be a fixed or hard disk drive, a floppy disk drive, a CDROM drive, a tape drive, or other device locally or remotely (e.g. via Internet) connected. The functions of the present invention are performed by the computer processor executing computer program codes, which is stored in the memory unit or the external storage device. The computer system may suitably be any one of the types that are well known in the art such as a mainframe computer, a minicomputer, a workstation, or a personal computer. The computer system may run any of a number of well known computer operating systems including IBM OS/390®, IBM AS/400®, IBM OS/2®, Microsoft Windows NT®, Microsoft Windows 2000®, and many variations of OSF UNIX.

Figure 2:
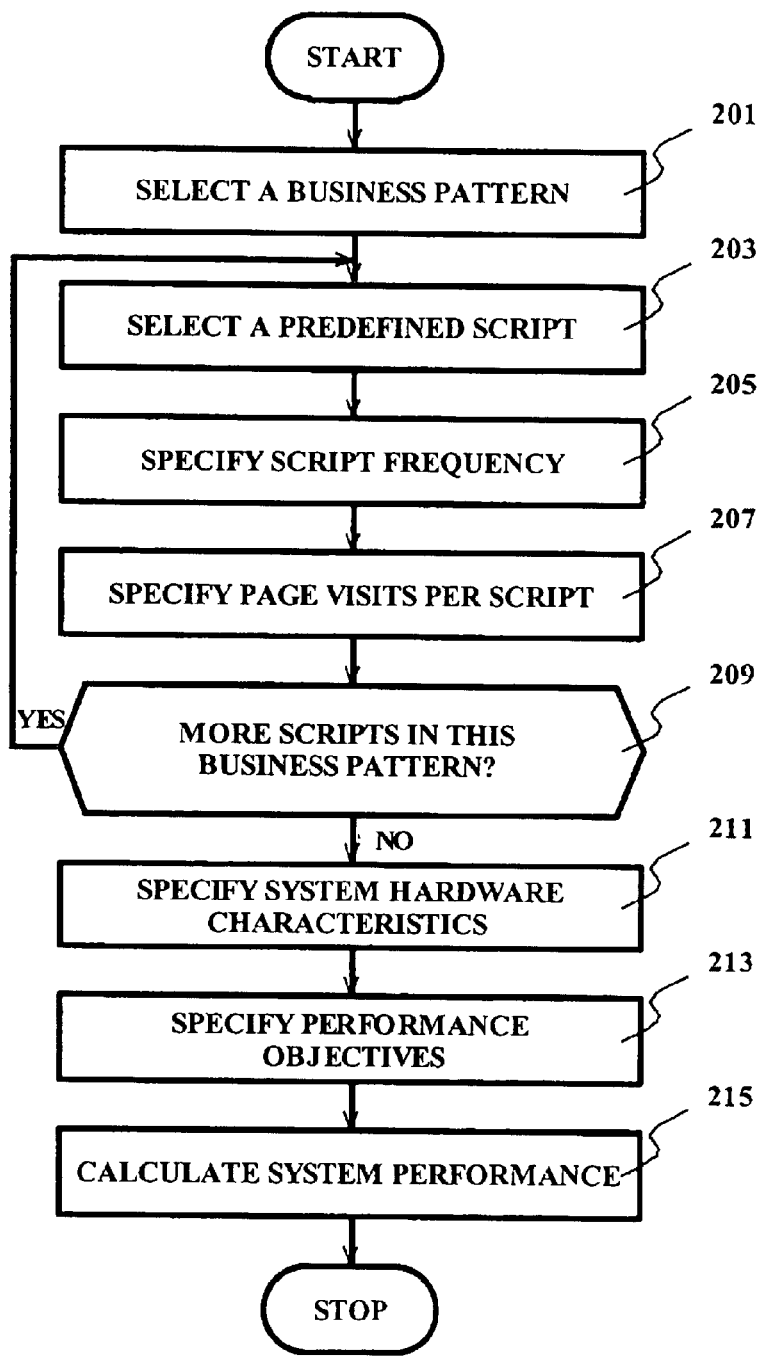
FIG. 2 illustrates a flow diagram of the steps performed by a modeling tool in accordance with the present invention to estimate system performance using business patterns.

FIG. 2 illustrates a flow diagram of the steps performed using a modeling tool in accordance with the present invention to estimate system performance using business patterns and scripts. In step 201, a business pattern is selected from a supplied list of business patterns that most resembles the expected usage of the computer system. This list may include business patterns such as: user-to-data (e.g. sites that provide information aggregation such as search engines, newspapers and magazines, Olympics and Wimbledon), user-to-business (e.g. sites for self-service system interactions such as online banking, online trading, making travel arrangements, tracking packages), user-to-online-buying (e.g. sites for electronic commerce such as buying books, cars, clothes), business-to-business (e.g. e-Marketplace sites such as those providing supply chain management), and user-to-user (e.g. sites that provide collaboration among individual users such as e-mails and instant messengers), etc. A detailed description of each business pattern is supplied to the modeling tool user.

Within each business pattern, a number of predefined scripts are defined. A predefined script is a complete user session consisting of multiple web interactions to accomplish some task. For example, for the online shopping business pattern, predefined scripts may include: "browse" (i.e. browsing a catalog), "search" (i.e. searching for a specific product), and "buy" (i.e. purchasing a product). In addition, each script is associated with a number of parameters. For example, the "script frequency" parameter is the relative proportion (i.e. percentage) of scripts in a given business pattern. The sum of the percentages for all the scripts within a given business pattern equals to 100%. Or, the "page visits" per script parameter is the number of different page visits that make up each script. It is a measure of how long the user is interacting with the system. Those of ordinary skill in the art will recognize that various other predefined scripts and associated parameters could be defined within a business pattern to measure a workload. The "script frequency" and the "page visits" are not the sole determining factor of the amount of work done on the system—the script details also play a role. For example, a "buy" script will typically generate much more work on the backend database server than a "browse" script.

In step 203, a predefined script is selected. Next in step 205, the script frequency (i.e. the percentage of times a user entering the system will execute that script), is specified. Alternatively, a default value may be specified.

In step 207, the number of page visits per script is specified next. Each predefined script will be based on a specific number of user steps or actions, each of which corresponds to a single page visit. If it is determined that a typical user interaction for the workload to be modeled has somewhat more (or less) page visits than the default page visits for the predefined script, the number of page visits for each predefined script may be modified to reflect this increase (or decrease) in complexity.

If in step 209 it is determined that there are additional predefined scripts in this business pattern, the process is moved back to step 203 to select another script and continue to specify the associated parameters for that script in steps 205 and 207. Otherwise, the process is moved to step 211.

After all the predefined scripts and their associated parameters are specified, the hardware characteristics of the computer system for which performance modeling is to be performed, is specified in step 211. This typically involves specifying the number and type of the target devices (i.e. devices being modeled) such as processors and disks comprising the system hardware. Other devices such as busses and network connections can also be specified depending on the level of detail included in the model.

Next, in step 213 the objectives for the performance calculations, such as the user arrival rate objective and maximum allowed response time objective are specified. The actual performance calculations are done in step 215. These calculations are described in more detail in FIG. 3 and FIG. 4.

Figure 3:
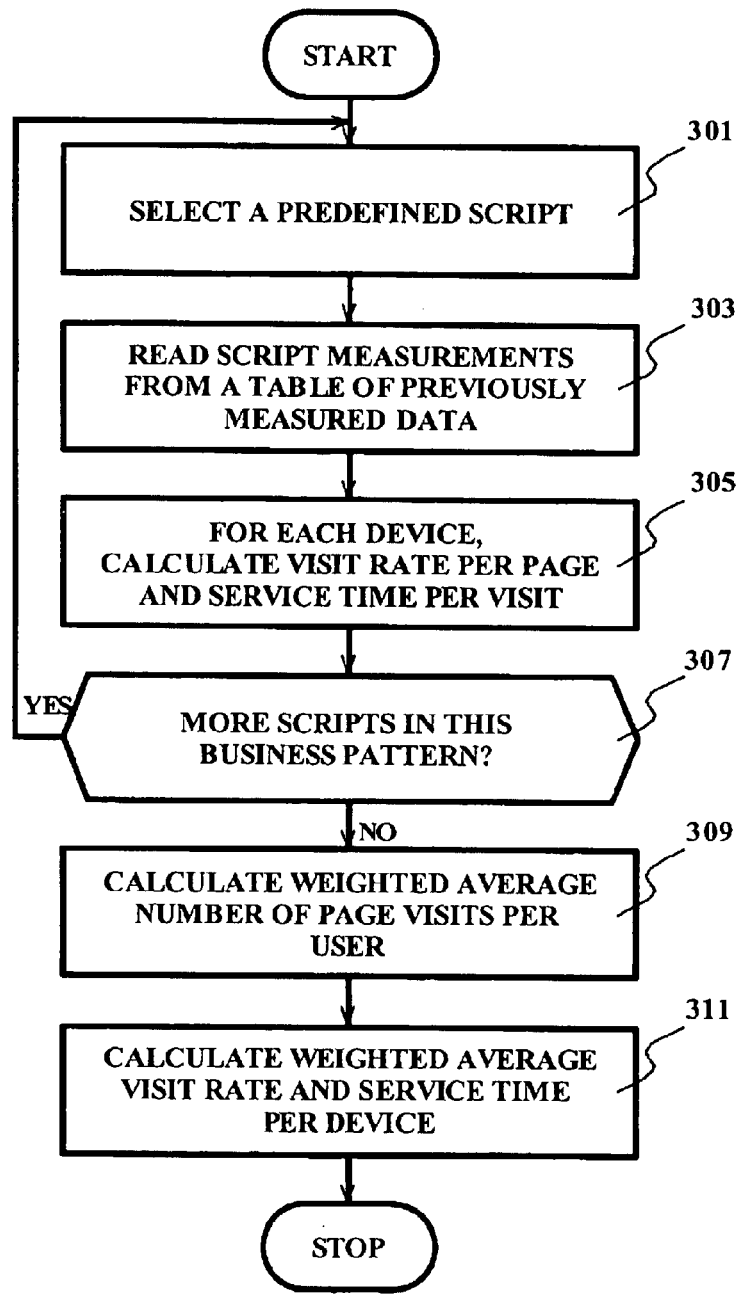
FIG. 3 illustrates a flow diagram of the steps performed to derive an average composite workload from the scripts in the selected business pattern.

FIG. 3 illustrates a flow diagram of the steps performed to derive an average composite workload from the predefined scripts in the selected business pattern. The algorithm that performs those steps starts with selecting a predefined script in step 301. In step 303, the script measurement data values are read from a table of previously measured (or estimated) data. This includes data values for the processor service time and the number of disk IO operations per page visit for the selected predefined script. Those of ordinary skill in the art will recognize that present invention is not limited to these measured data. Additional measured data, such as the number of bytes transmitted or received (i.e. communicated) over the network can also be included depending on the details to be modeled.

In step 305, the visit rates per page and service times per visit for each target device are calculated. For disks, the visit rate per page is given by:

$$diskVisitRate=(Disk\ IO\ per\ page\ visit)/(total\ disks\ in\ system);$$

The disk service time (i.e. diskServTime) is typically given as a fixed average service time in the neighborhood of 10 ms–15 ms.

For processors, each disk IO results in a separate processor service interval. So, the total processor visits rate per page (per device) is given by:

$$procVisitRate=(1+(Disk\ IO\ per\ page\ visit))/(total\ processors\ in\ the\ system);$$

The processor service time per visit is given by:

$$procServTime=(Processor\ service\ time\ per\ page\ visit)/(1+Disk\ IO\ per\ page\ visit);$$

If in step 307 it is determined that there are additional predefined scripts in this business pattern, the above steps are repeated for the next script starting at step 301. Otherwise, step 309 is performed.

When the calculations have been completed for all scripts, a weighted average composite application workload is calculated for each target device. First in step 309, the weighted average number of page visits per user is calculated by taking a weighted average across all scripts:

```
avgPageVisitis = 0;
For i = 1 to (number_of_scripts);
    avgPageVisitis = avgPageVisitis + (pageVisits(i) * freq(i));
Next i;
```

Where:
pageVisits(i)=number of page visits specified for script "i"
freq(i)=specified fraction of users that execute script "i"

Then in step 311, the average visit rates per page for processors and disks can be calculated by taking a weighted average across all scripts. The same method can be used for the average processor service time:

```
avgProcServTime = 0;
avgProcVisitRate = 0;
avgDiskVisitRate = 0;
For i = 1 to (number_of_scripts);
    avgProcServTime = avgProcServTime + (procServTime(i)*pageVisits(i)*freq(i));
    avgProcVisitRate = avgProcVisitRate + (procVisitRate(i)*pageVisits(i)*freq(i));
    avgDiskVisitRate = avgDiskVisitRate + (diskVisitRate(i)*pageVisits(i)*freq(i));
Next i;
    avgProcServTime = avgProcServTime / avgPageVisits;
    avgProcVisitRate = avgProcVisitRate / avgPageVisits;
    avgDiskVisitRate = avgDiskVisitRate / avgPageVisits;
```

Note that the average disk service time (i.e. avgDiskServTime) can be assumed to be a fixed value between 10 ms and 15 ms.

Figure 4:
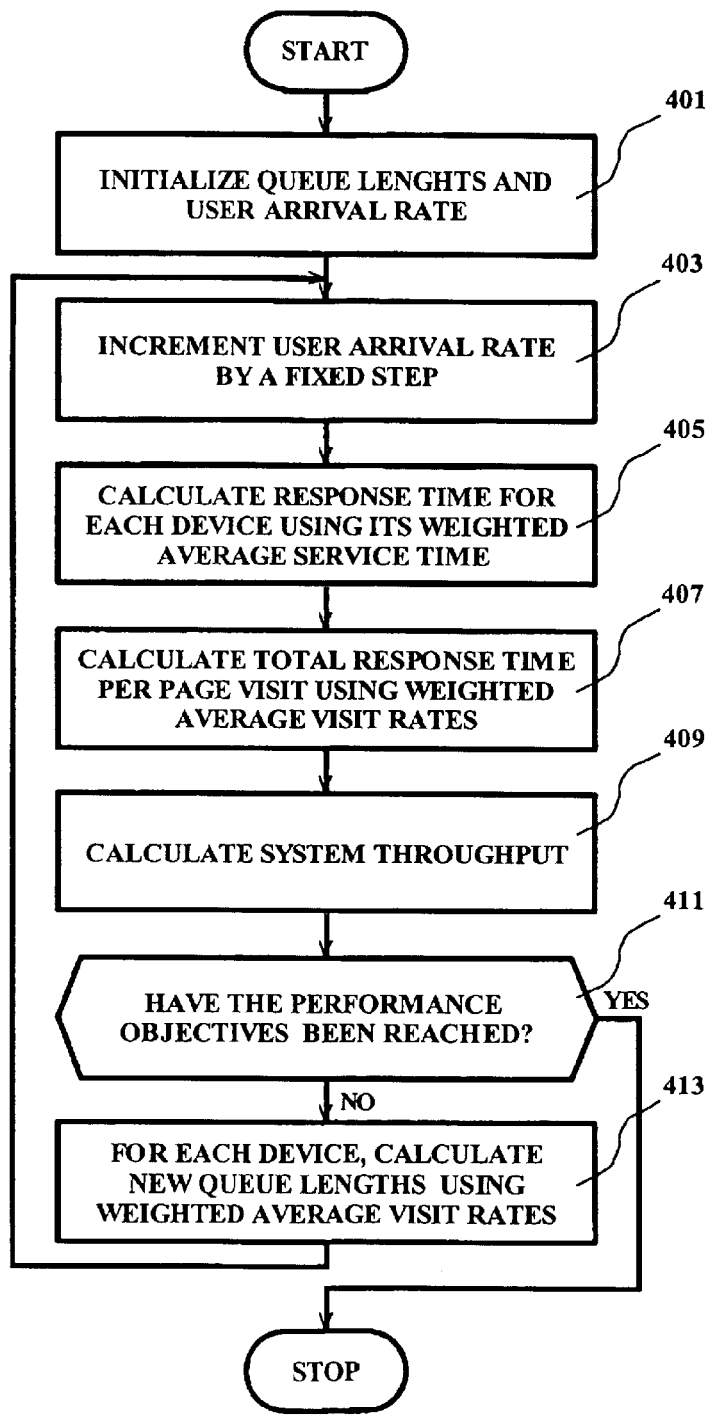
FIG. 4 illustrates a flow diagram of the steps performed to estimate system performance using a standard Mean Value Analysis methodology.

FIG. 4 illustrates a flow diagram of the steps performed to estimate system performance using a standard Mean Value Analysis methodology. Given the composite application workload calculated from the weighted averages of the predefined scripts, we can estimate the performance for that applications running on a specified hardware configuration. This is done by exploiting Mean Value Analysis techniques, a variation of which is described below.

In step 401, the calculations are started by initializing the queue lengths to zero for the processors, disks, and any other devices, which are to be modeled (i.e. target devices). The user arrival rate is also set to zero. In step 403, the user arrival rate is incremented by a fixed step, such as by 0.1 users per second.

In step 405, the response times are calculated for each type of target device being modeled in the system using the following equations:

procRespTime=avgProcServTime*(1+procQueLength);

diskRespTime=avgDiskServTime*(1+diskQueLength);

In step 407, the total response time per page visit is calculated by summing up the response time for all devices. This can be done with the following equation:

$$totalRespTime = \\ procRespTime * avgProcVisitRate * (\text{number of processors}) + \\ diskRespTime * avgDiskVisitRate * (\text{number of disks});$$

In step 409, the total system throughput in terms of page visits per second can be calculated from the user arrival rate using the following equation:

throughput=avgPageVisits*(user arrival rate);

In step 411, a test is done to determine if the specified performance objective have been reached. The objectives include a specified user arrival rate, or average response time, or any number of other criteria specified in step 213 of FIG. 2. If the objectives were reached, the calculations are done and the results can be displayed. If the objectives have not been reached yet, new queue lengths are calculated for each type of target device in step 413. The following equations are used:

procQueLength=throughput*avgProcVisitRate*procRespTime;

diskQueLength=throughput*avgDiskVisitRate*diskRespTime;

The calculations are then iterated again starting with step 403 until the objectives are finally reached.

Those of ordinary skill in the art will recognize that the present invention and the algorithms described above are not limited to a specific hardware. The above algorithms can be extended to more detailed modeling in a number of other ways. For example, it can be used to model multi-tiered hardware systems, raid disks, paging operations, or other hardware facilities such as busses, network connections, and edge servers.

Those of ordinary skill in the art will further recognize that although the system simulator of the present invention is originally intended to model complex web sites, the methodology can be equally applied to other computer systems. The applications are defined based on the intended uses of the computer system and detailed knowledge of the workload characteristics is not necessary, although it can be used to increase the accuracy of the simulation. Using this simulator, typical IT infrastructures can be analyzed and related models can be developed to assist in predicting and planning how to meet future requirements.

What is claimed is:

1. A method to be performed on a first computer system for estimating the performance of a second computer system comprising a plurality of target devices, said method comprising the steps of:

identifying a business pattern from a plurality of business patterns representative of the expected usage of said second computer system;

establishing a value for each parameter in a plurality of parameters associated with each script in a plurality of predefined scripts, wherein said plurality of predefined scripts corresponds to said identified business pattern;

identifying hardware characteristics and performance objectives of said second computer system; and calculating a performance estimate for said second computer system utilizing said parameter values, said hardware characteristics and said performance objectives.

2. The method of claim 1, wherein said plurality of business patterns includes a business pattern selected from the group consisting of user-to-data, user-to-online-buying, user-to-business, and business-to-business business patterns.

3. The method of claim 2, wherein said plurality of parameters includes a script frequency parameter and a page visits per script parameter.

4. The method of claim 3, wherein said hardware characteristics comprise a plurality of types of devices associated with said plurality of target devices and the number of devices for each of said types of devices, said plurality of target devices comprises processors, disks, busses, and network connections.

5. The method of claim 4, wherein said performance objectives comprise a user arrival rate objective and a maximum allowed response time objective.

6. The method of claim 5, wherein said calculating step further comprises the steps of:

for each script in said plurality of predefined scripts, reading script measurements data from a table of previously measured values, and calculating a visit rate per page and a service time per visit for each target device in said plurality of target devices using said script measurements data;

calculating a weighted average number of page visits per user utilizing said script frequency parameter and said page visits per script parameter; and for each target device in said plurality of target devices, calculating a weighted average visit rate based on said visit rates and a weighted average service time based on said service times.

7. The method of claim 6, wherein said script measurements data comprise a processor service time, a number of disk IO operations per page visit, and a number of bytes communicated over the network.

8. The method of claim 6, further comprising the steps of:

(a) initializing a queue length for each target device in said plurality of target devices and initializing a user arrival rate;

(b) calculating a target device response time for each target device in said plurality of target devices utilizing said weighted average service time and said queue length;

(c) calculating a total response time based on said target device response times and said weighted average visit rates;

(d) calculating a system throughput utilizing said weighted average number of page visits per user and said user arrival rate; and (e) if said performance objectives are not reached, adjusting said queue lengths and said user arrival rate; and repeating steps (b), (c) and (d) until said performance objectives are reached.

9. The method of claim 8, wherein said queue lengths are adjusted based on said calculated system throughput, said weighted average visit rates, and said target device response times.

10. The method of claim 1, wherein said second computer system is same as said first computer system.

11. A first computer system for estimating the performance of a second computer system comprising a plurality of target devices, said first computer system comprising:
a computer; and
one or more computer programs executed by said first computer system for performing the steps of:
identifying a business pattern from a plurality of business patterns representative of the expected usage of said second computer system;
establishing a value for each parameter in a plurality of parameters associated with each script in a plurality of predefined scripts, wherein said plurality of predefined scripts corresponds to said identified business pattern;
identifying hardware characteristics and performance objectives of said second computer system; and
calculating a performance estimate for said second computer system utilizing said parameter values, said hardware characteristics and said performance objectives.

12. The first computer system of claim 11, wherein said plurality of business patterns includes a business pattern selected from the group consisting of user-to-data, user-to-online-buying, user-to-business, and business-to-business business patterns.

13. The first computer system of claim 12, wherein said plurality of parameters includes a script frequency parameter and a page visits per script parameter.

14. The first computer system of claim 13, wherein said hardware characteristics comprise a plurality of types of devices associated with said plurality of target devices and the number of devices for each of said types of devices, said plurality of target devices comprises processors, disks, busses, and network connections.

15. The first computer system of claim 14, wherein said performance objectives comprise a user arrival rate objective and a maximum allowed response time objective.

16. The first computer system of claim 15, wherein said calculating step further comprises the steps of:
for each script in said plurality of predefined scripts, reading script measurements data from a table of previously measured values, and calculating a visit rate per page and a service time per visit for each target device in said plurality of target devices using said script measurements data;
calculating a weighted average number of page visits per user utilizing said script frequency parameter and said page visits per script parameter; and
for each target device in said plurality of target devices, calculating a weighted average visit rate based on said visit rates and a weighted average service time based on said service times.

17. The first computer system of claim 16, wherein said script measurements data comprise a processor service time, a number of disk IO operations per page visit, and a number of bytes communicated over the network.

18. The first computer system of claim 16, further comprising the steps of:
(a) initializing a queue length for each target device in said plurality of target devices and initializing a user arrival rate;
(b) calculating a target device response time for each target device in said plurality of target devices utilizing said weighted average service time and said queue length;
(c) calculating a total response time based on said target device response times and said weighted average visit rates;
(d) calculating a system throughput utilizing said weighted average number of page visits per user and said user arrival rate; and
(e) if said performance objectives are not reached, adjusting said queue lengths and said user arrival rate; and repeating steps (b), (c) and (d) until said performance objectives are reached.

19. The first computer system of claim 18, wherein said queue lengths are adjusted based on said calculated system throughput, said weighted average visit rates, and said target device response times.

20. The first computer system of claim 11, wherein said second computer system is same as said first computer system.

21. An article of manufacture comprising a program storage device readable by a first computer system and tangibly embodying one or more programs of instructions executable by said first computer system to perform method steps for estimating the performance of a second computer system comprising a plurality of target devices, said method steps comprising the steps of:
identifying a business pattern from a plurality of business patterns representative of the expected usage of said second computer system;
establishing a value for each parameter in a plurality of parameters associated with each script in a plurality of predefined scripts, wherein said plurality of predefined scripts corresponds to said identified business pattern;
identifying hardware characteristics and performance objectives of said second computer system; and
calculating a performance estimate for said second computer system utilizing said parameter values, said hardware characteristics and said performance objectives.

22. The article of manufacture according to claim 21, wherein said plurality of business patterns includes a business pattern selected from the group consisting of user-to-data, user-to-online-buying, user-to-business, and business-to-business business patterns.

23. The article of manufacture according to claim 22, wherein said plurality of parameters includes a script frequency parameter and a page visits per script parameter.

24. The article of manufacture according to claim 23, wherein said hardware characteristics comprise a plurality of types of devices associated with said plurality of target devices and the number of devices for each of said types of devices, said plurality of target devices comprises processors, disks, busses, and network connections.

25. The article of manufacture according to claim 24, wherein said performance objectives comprise a user arrival rate objective and a maximum allowed response time objective.

26. The article of manufacture according to claim 25, wherein said calculating step further comprises the steps of:
for each script in said plurality of predefined scripts, reading script measurements data from a table of previously measured values, and calculating a visit rate per page and a service time per visit for each target device in said plurality of target devices using said script measurements data;
calculating a weighted average number of page visits per user utilizing said script frequency parameter and said page visits per script parameter; and
for each target device in said plurality of target devices, calculating a weighted average visit rate based on said visit rates and a weighted average service time based on said service times.

27. The article of manufacture according to claim 26, wherein said script measurements data comprise a processor service time, a number of disk IO operations per page visit, and a number of bytes communicated over the network.

28. The article of manufacture according to claim 26, further comprising the steps of:
(a) initializing a queue length for each target device in said plurality of target devices and initializing a user arrival rate;
(b) calculating a target device response time for each target device in said plurality of target devices utilizing said weighted average service time and said queue length;
(c) calculating a total response time based on said target device response times and said weighted average visit rates;
(d) calculating a system throughput utilizing said weighted average number of page visits per user and said user arrival rate; and
(e) if said performance objectives are not reached, adjusting said queue lengths and said user arrival rate; and repeating steps (b), (c) and (d) until said performance objectives are reached.

29. The article of manufacture according to claim 28, wherein said queue lengths are adjusted based on said calculated system throughput, said weighted average visit rates, and said target device response times.

30. The article of manufacture according to claim 21, wherein said second computer system is same as said first computer system.

31. A method for estimating the performance of a computer system comprising a plurality of target devices, said method comprising the steps of:
receiving a plurality of business patterns from a modeling tool for projecting system performance of said computer system;
selecting a business pattern from said plurality of business patterns representative of the expected usage of said computer system;
providing a value for each parameter in a plurality of parameters associated with each script in a plurality of predefined scripts, wherein said plurality of predefined scripts corresponds to said selected business pattern;
specifying hardware characteristics and performance objectives of said computer system; and
invoking said modeling tool to project system performance of said computer system, whereby said modeling tool utilizes said parameter values, said hardware characteristics and said performance objectives to calculate said system performance projection.

* * * * *